United States Patent Office 3,311,657
Patented Mar. 28, 1967

3,311,657
PRODUCTION OF POLYFLUOROALIPHATIC CARBOXYLIC ACIDS FROM POLYFLUORINATED OLEFINS
Donald P. Graham, Wilmington, Del., assignor to E. I. du Pont de Nemours and Company, Wilmington, Del., a corporation of Delaware
No Drawing. Filed Sept. 1, 1964, Ser. No. 393,754
16 Claims. (Cl. 260—539)

This invention relates to the production of polyfluoroaliphatic carboxylic acids.

Polyfluoroaliphatic carboxylic acids are known compounds. Perfluoropropionic acid, which has the formula $CF_3CF_2CO_2H$, is disclosed in J.A.C.S., 75, 3152 (1953). Longer chain acids of similar structure are described in U.S. Patent 2,567,011, and other acids are described in volume II of J. H. Simon's "Fluorine Chemistry" (Academic Press, New York, 1950) and A. M. Lovelace et al., "Aliphatic Fluorine Compounds" (Reinhold Publishing Corp., New York, 1958).

The present invention provides a new method for the preparation of polyfluoroaliphatic carboxylic acids of the type described in the aforementioned prior art. This method comprises reacting a polyfluorinated olefin with carbon dioxide and alkali metal fluoride in the presence of a polyalkyleneglycol dialkylether or acetonitrile. The temperature of the reaction may range from about −30° C. to 180° C., and pressures may vary from about one to 15 atmospheres.

The polyfluorinated olefins used as reactants in this invention have the general formula $CF_2=CXY$, where X is chlorine, fluorine, or the perfluorovinyl group $$(CF=CF_2)$$

and Y is chlorine, fluorine, or the trifluoromethyl group ($CF_3$). The following compounds are the specific members coming within the general formula, and any of these compounds may be used in this invention: tetrafluoroethylene ($CF_2=CF_2$), chlorotrifluoroethylene $$(CF_2=CFCl)$$

1,1 - difluoro - 2,2 - dichloroethylene ($CF_2=CCl_2$), perfluorobutadiene-1,3 ($CF_2=CFCF=CF_2$), perfluoropropylene ($CF_2=CFCF_3$), 2-chloropentafluoropropylene ($CF_2=CClCF_3$), 2-chloropentafluorobutadiene-1,3

$$(CF_2=CClCF=CF_2)$$

and perfluoroisoprene ($CF_2=C(CF_3)CF=CF_2$). With the exception of perfluoroisoprene which boils at 30° C., all of the useful olefins have boiling points below 20° C. and therefore may be added as gases to the reaction system. The carbon dioxide may also be added in the gaseous state, either separately or in admixture with the olefin. In instances where the olefin is in liquid form, it may be added to the reaction vessel along with the polyalkyleneglycol dialkylether or acetonitrile and the alkali metal fluoride, and the carbon dioxide can be added separately in gaseous form. The relative proportions of carbon dioxide and olefin or the sequence of addition are not especially critical so long as there is some of each reactant present in the reaction system. However, it is preferred to introduce these two reactants into the reaction zone in equimolar amounts.

The glycol ethers that are suitable for this invention have the general formula: $RO(C_pH_{2p}O)_nR$, where R is lower alkyl of 1 to 6 carbon atoms, $p$ is 2 to 4, and $n$ is from 1 to 4. Representative examples of such ethers are: ethylene glycol dimethyl, diethyl and dibutyl ethers, diethylene glycol dimethyl, diethyl, dibutyl and dihexyl ethers, triethylene glycol dimethyl and diethyl ethers, tetraethylene glycol dimethyl, diethyl and dihexylethers, propylene glycol dimethyl ether, tetrapropylene glycol diethyl ether, tetramethylene glycol dimethyl and diethyl ethers. The glycol ethers of this invention, and particularly those where R is methyl or ethyl, $p$ is 2, and $n$ is 2–4, are preferred, e.g., triethyleneglycol dimethylether. The amount of polyethyleneglycol dialkylether or acetonitrile used is not critical, so long as there is enough of this material present to form an easily stirrable slurry of the relatively insoluble alkali metal fluoride. Amounts ranging from 1 to 2 parts by weight of solvent per part of alkali metal fluoride work well in the reaction, but one skilled in the art will readily recognize that amounts outside of these ranges could also be used to effect the reaction. Alkali metal fluorides which may be used in this reaction include lithium fluoride, sodium fluoride, potassium fluoride, rubidium fluoride, and cesium fluoride. Cesium fluoride is a preferred material.

To obtain maximum yields, carbon dioxide and the polyfluorinated olefins are added to the alkali metal fluoride in the polyalkyleneglycol dialkyl ether or acetonitrile until reaction ceases. Cessation of the reaction can be readily determined. When the carbon dioxide and the polyfluorinated olefin are introduced in the gaseous state, a pressure drop will occur in the reaction vessel as these materials are consumed in the reaction. Termination of the reaction is indicated by the lack of a pressure drop in the vessel after the introduction of the gaseous reactants. Another means of determining completion of the reaction is by the presence of the alkali metal fluoride reactant. As previously mentioned, alkali metal fluoride is relatively insoluble in the polyalkyleneglycol dialkylether or acetonitrile. However, upon reaction this material is gradually converted to a soluble salt, and the complete disappearance of the alkali metal fluoride is a good indication that the reaction is nearly complete. In carrying out the preferred form of the present process, cesium fluoride, optionally in finely divided form, is suspended in a polyethyleneglycol ether and the polyfluorinated olefin and carbon dioxide in gaseous form are added in increments until further material ceases to react.

The end product of the reaction is the alkali metal salt of polyfluorinated carboxylic acids of the structure $CF_3CXYCO_2Me$, where X and Y have the meanings set forth above and Me is an alkali metal. These salts are generally soluble in the liquid reaction medium, and they are preferably separated therefrom by the addition of an organic liquid such as benzene in which the salt is insoluble. Recovery by precipitation of the salt using benzene or diethyl ether is preferred. The solvent mixture remaining after the solid salt is collected may be separated by distillation for reuse, if so desired.

Also, if so desired, the recovered salt may be converted to the free acid form by acidification. The isolated alkali metal salt can be converted to the free acid by treatment with a strong acid, usually an inorganic acid, such as sulfuric, hydrochloric, hydrobromic, hydriodic, or perchloric acid. The treating acid must be at least as strong as the polyfluorocarboxylic acid product, and preferably stronger. Strong sulfuric acid, say, 80–100% sulfuric acid, is preferred. The polyfluorocarboxylic acids are usually insoluble in the strong acids and are easily separated therefrom. The recovered polyfluorocarboxylic acids may then be purified by distillation or other conventional means, if so desired.

In preferred commercial operation of the present process, it is generally desirable to recover the cesium values for reconversion to cesium fluoride. This may be done by first recovering the cesium salt of the acidifying acid and then passing an aqueous solution of the salt through an anion exchange resin in the fluoride form, such as "Dowex–1" or "Dowex–21K" anion exchange resins. The recovered cesium fluoride is dried before reuse.

The final products of the present process are acids of structure $CF_3CXYCO_2H$, i.e., $CF_3CF_2CO_2H$,

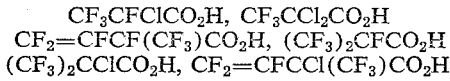

and $CF_2=CFC(CF_3)_2CO_2H$ or the alkali metal salts thereof. These acids are very strong, nonoxidizing acids which are useful for metal treating operations. The acids may also be reduced to alcohols or aldehydes with hydrogen and a catalyst or lithium aluminum hybride. The general conditions for these reductions are described in the prior art. The carboxyl group of these acids may also be converted to a trifluoromethyl group using sulfur tetrafluoride, thus producing perfluoro or chlorofluoropropanes, butanes, pentanes, pentenes, and hexenes. These acids are also easily converted to the acid chlorides using standard techniques such as reaction with phosphorus pentachloride.

It has been previously pointed out that temperatures as low as −30° C. may be used in the present invention. However, at temperatures much below 15° C., the reaction rate is slow and higher temperatures are recommended to give sufficiently fast reaction rates. On the other hand, the upper limit of temperature should be about 180° C. since at temperatures above this there may be a tendency to form undesirable amounts of other products. The optimum temperature for a particular reaction will vary depending upon the alkali metal fluoride used in the reaction. When sodium fluoride is used, the reaction operates best at temperatures of less than 110° C., while potassium fluoride gives best results at about 150° C. Also, preferred temperatures will vary within the ranges specified above, depending upon the polyolefin employed in the reaction. For example, the optimum temperatures using tetrafluoroethylene and cesium fluoride are about 90° C.–100° C., while the optimum temperature for use with cesium fluoride and perfluorobutadiene, or 2-chloropentafluorobutadiene, or perfluoroisoprene is about 20° C.–30° C. For the remaining useful olefins and cesium fluoride, the optimum temperature is about 45° C.–55° C. Based upon the preferred temperature ranges for specific polyfluoro olefins, it may be stated that the preferred temperature range for this invention employing cesium fluoride is about 20° C.–100° C. The reaction pressure is not critical and may vary from about one atmosphere to about 15 atm. The useful olefins which have vapor pressures greater than 15 atm. at 100° C., e.g., tetrafluoroethylene, have very limited solubility in the reaction solvents so that little or no benefit is gained by using higher pressures.

The process of the present invention is carried out under anhydrous conditions when cesium fluoride and polyether solvents are used, and reactants and equipment should be thoroughly dried before use. However, when acetonitrile is used, anhydrous conditions are not required. The reaction equipment itself need only withstand the reaction pressure used since corrosion is not a problem. At lower pressures, say, below 40 p.s.i.g., glass equipment may be used. At higher pressures, metallic equipment such as an autoclave is preferred. Agitation should be used. Effective agitation will keep the solvent saturated with the polyfluorinated olefin and carbon dioxide, and it will keep the surface of the alkali metal fluoride clean. The present reaction appears to take place at the surface of the solid alkali metal fluoride since this salt does not dissolve in the reaction media. Good agitation insures that the reaction product dissolves rapidly from the surface of the cesium fluoride, thus maintaining this surface constantly reactive.

Depending on the polyfluorinated olefin used, reaction times up to several days are required. Under otherwise equivalent conditions, the reaction rate decreases with the number of perfluoroalkyl substituents on the polyfluoroolefin.

For a clearer understanding of the invention, the following specific examples are given. These examples are intended to be merely illustrative of the invention and not in limitation thereof. Unless otherwise specified, all parts are by weight.

*Example I*

A mixture of 100 parts of solid cesium fluoride in 200 parts of dry triethyleneglycol dimethylether was stirred in a pressure bottle under an atmosphere of dry nitrogen. The atmosphere in the bottle was replaced with tetrafluoroethylene at a pressure of 10 p.s.i.g. Carbon dioxide was added to the bottle, bringing the pressure to 12 p.s.i.g. The contents of the bottle were then heated to 100° C. and this temperature was maintained throughout the reaction by continued heating. The pressure within the bottle decreased as the reactants were consumed, and it was periodically brought up to 20 p.s.i.g. by adding equimolar amounts of tetrafluoroethylene and carbon dioxide. Such additions were continued and the stirring action was maintained until the pressure ceased to drop and the solid cesium fluoride had been consumed, ca. 5 days—total weight gain 97 parts. The reaction mixture was then cooled and poured into 2200 parts of dry benzene under anhydrous conditions. A solid precipitate forms which was collected by filtration. The filter cake was washed with diethylether and dried at room temperature, giving 175 parts of cesium perfluoropropionate, yield 89.5% based on cesium fluoride used.

The cesium salt, 174.5 parts, was added to 280 parts of 96% C.P. sulfuric acid which was chilled in an ice-bath with agitation. The resulting slurry was allowed to stand overnight at room temperature, whereupon the perfluoropropionic acid formed an immiscible upper liquid layer as the cesium perfluoropropionate was converted to the free acid form. This upper liquid layer consisting of 93 parts of crude perfluoropropionic acid was separated from the lower sulfuric acid layer, and it was distilled at 50° C./112–113 mm. to yield 88.5 parts of clear, colorless pentafluoropropionic acid. The infrared spectrum of this product was identical with that of an authentic sample, the spectrum of which is given in J. H. Simons, "Fluorine Chemistry," volume II, p. 485 (Academic Press, New York, 1950).

*Example II*

A slurry of 90 parts of cesium fluoride in 180 parts of triethyleneglycol dimethylether was stirred in a pressure bottle as in Example I. The atmosphere of the pressure bottle was replaced with hexafluoropropylene. The pressure within the bottle was then increased to 15 p.s.i.g. using equimolar amounts of hexafluoropropylene and carbon dioxide. The contents of the bottle were warmed to 50° C., and this temperature and the stirring were maintained throughout the reaction. As the pressure decreased, it was brought up to 20 p.s.i.g. with equimolar amounts of carbon dioxide and hexafluoropropylene. These additions were continued until there was no further reaction (ca. 22 hrs.) as evidenced by the lack of a pressure drop within the reaction vessel. The weight gain was 144 parts. The reaction mass was then filtered to remove a small amount of polymerized hexafluoropropylene which formed during reaction, and the syrupy filtrate was added slowly to 1760 parts of dry benzene under anhydrous conditions with agitation and allowed to stand overnight. The precipitated solids were collected by filtration, washed with diethylether and dried at room temperature under vacuum, giving 132 parts of cesium heptafluoroisobutyrate. The dry cesium salt was added to 280 parts of chilled C.P. 96% sulfuric acid, agitated for 20 minutes, and allowed to stand. An organic layer separated giving 72 parts of crude heptafluoroisobutyric acid. The crude acid was distilled at reduced pressure (B.P. 54.4° C./52 mm.), giving 66.7 parts of clear, colorless perfluoroisobutyric acid [$(CF_3)_2CFCO_2H$], further identified by comparison of its infrared spectrum with that of a sample of perfluoroisobutyric acid, the spectrum of which is given in the previously-cited Simons, loc. cit., vol. II, p. 488.

*Example III*

A slurry of 15 parts of cesium fluoride in 28 parts of dry diethyleneglycol dimethylether was prepared in a pressure bottle containing a nitrogen atmosphere and a stirrer which was operated throughout the reaction. The nitrogen atmosphere was replaced with chlorotrifluoroethylene and the pressure was then increased to 15 p.s.i.g. with carbon dioxide. The contents of the bottle were heated to 50° C. and maintained at this temperature until reaction ceased. As the pressure decreased, it was intermittently brought up to 20 p.s.i.g. using equimolar amounts of carbon dioxide and chlorotrifluoroethylene. When the reaction was complete, ca. 24 hrs. determined as in Example I, the weight gain was 16 parts. The reaction mass was then poured into 500 parts of diethylether under anhydrous conditions. This mixture was chilled for one hour in an ice-bath. The precipitated solids were collected by filtration, washed with diethylether, and dried under vacuum at room temperature, giving 16.5 parts of crude cesium 2-chlorotetrafluoropropionate ($CsO_2CCFClCF_3$). Upon further cooling of the reaction mass containing the diethylether to —30° C., an additional 3 parts of crude cesium 2-chlorotetrafluoropropionate was obtained. This last increment was washed with ether, dried under vacuum at room temperature, and then mixed with the portion previously recovered.

One part of the above cesium salt was added to 3 parts of C.P. 96% sulfuric acid. The mixture was poured carefully onto ice. The resulting mixture was extracted with 1,1,2-trichloro-1,2,2-trifluoroethane. Evaporation of the solvent from the extract gave clear, colorless 2-chlorotetrafluoropropionic acid ($CF_3CFClCO_2H$) whose structure was confirmed by its nuclear magnetic resonance spectrum.

*Example IV*

A slurry of 10 parts cesium fluoride in 10 parts dry diethyleneglycol dimethylether was prepared under a nitrogen atmosphere in a pressure bottle containing a stirrer which was operated throughout the reaction. The atmosphere within the bottle was replaced with carbon dioxide, then the bottle was evacuated. Perfluorobutadiene-1,3 was added to the evacuated bottle to a pressure of 5 p.s.i.g. Then carbon dioxide was added until the pressure was 25 p.s.i.g. The resulting mixture was maintained at room temperature during the reaction. As the pressure decreased, it was brought up to 20 p.s.i.g. using equimolar amounts of carbon dioxide and perfluorobutadiene-1,3. When the reaction was complete, 51 hrs. determined as before, the weight gain was 19 parts. The syrupy reaction mixture was added to 1000 parts of diethylether cooled to 0° C.–2° C. The solids which precipitated were collected by filtration, washed with ether, and dried under vacuum at room temperature, giving 19.5 parts of crude cesium heptofluoro-2-methyl-3-butenoate [$CsO_2CCF(CF_3)CF=CF_2$]. A further 9.5 parts of the cesium salts were obtained by cooling the ether mixture at 0° C.–2° C. for several days.

*Analysis.*—Calcd. for $C_5F_7O_2Cs$: F, 37.2; Cs, 37.1. Found: F, 36.6; Cs, 35.7.

*Example V*

A suspension of 42 parts solid potassium fluoride in 94 parts diethyleneglycol dimethyl ether was placed in a shaker tube. The tube was sealed, cooled to —80° C., and evacuated. The atmosphere within the tube was replaced with tetrafluoroethylene, then 50 parts tetrafluoroethylene and 22 parts carbon dioxide were added. The tube was sealed and heated at 150° C. for 16 hours with agitation. After cooling, unreacted gases were vented and the remaining product discharged. The resulting slurry was filtered, the filter cake washed with solvent. The diethyleneglycol dimethyl ether was removed from the filtrate by heating at 50° C.–55° C. under vacuum, giving 31 parts of solid potassium pentafluoropropionate. The salt was slurried in 50 parts of 96% sulfuric acid at 0° C.–10° C. and the resulting pentafluoropropionic acid removed by distillation under reduced pressure, yield 10 parts. The product pentafluoropropionic acid was identified by comparison of its infrared spectrum with that given for this compound on page 485 in the previously cited Simons text.

*Example VI*

A suspension of 40 parts solid potassium fluoride in 18 parts acetonitrile was placed in a shaker tube. The tube was sealed, cooled to —80° C., and evacuated. The atmosphere within the tube was replaced with tetrafluoroethylene, then 50 parts tetrafluoroethylene and 22 parts carbon dioxide were added to the tube. The sealed tube was heated at 150° C. for 10 hours with agitation. After cooling, unreacted gases were vented and the remaining slurry discharged. The slurry was filtered and the collected solids washed with about 50 parts acetonitrile. The acetonitrile was then removed from the filtrate by distillation at 50° C.–55° C. under reduced pressure, giving 80 parts of solid potassium pentafluoropropionate. The solid was slurried with 270 parts of 96% sulfuric acid at 0° C.–10° C. The product pentafluoropropionic acid was distilled off at less than 50 mm. pressure, yield 61.5 parts. The pentafluoropropionic acid was identified by comparison of its infrared spectrum with that given for this compound on page 485 in the previously cited Simons text.

*Example VII*

A suspension of 40 parts solid potassium fluoride in 80 parts acetonitrile was placed in a shaker tube. The sealed tube was cooled to —80° C., evacuated, and 22 parts carbon dioxide and 75 parts hexafluoropropylene were added. The sealed tube was heated at 70° C. for 10 hours with agitation. After cooling, 57 parts of unreacted gases were vented. The remaining slurry was filtered and the filter cake washed with 30 parts acetonitrile. The acetonitrile was removed from the filtrate at reduced pressure, giving 10 parts of solid potassium heptafluoroisobutyrate. The solid was slurried with 36 parts conc. sulfuric acid at 0° C.–10° C. The product heptafluoroisobutyric acid was removed by distillation at 95° C.–100° C. at less than 5 mm. pressure, yield 5 parts. The heptafluoroisobutyric acid was identified by comparison of its infrared spectrum with that given for this compound on page 488 in the previously cited Simons text.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows.

I claim:

1. A process for preparing alkali metal salts of polyfluoroaliphatic carboxylic acids which comprises reacting a polyfluorinated olefin of the formula $CF_2=CXY$, where X is from the group consisting of Cl, F, and $CF=CF_2$ and Y is from the group consisting of Cl, F, and $CF_3$, with carbon dioxide and an alkali metal fluoride in the presence of a liquid reaction medium selected from the group consisting of acetonitrile and polyalkyleneglycol dialkylethers of the formula $RO(C_pH_{2p}O)_nR$, where R is lower alkyl of 1 to 6 carbon atoms, $p$ is 2 to 4, and $n$ is from 1 to 4, and recovering from said liquid reaction medium the alkali metal salt of a polyfluoroaliphatic carboxylic acid of the structure $CF_3CXYCO_2Me$, where X and Y have the meanings set forth above, and Me is an alkali metal.

2. The process of claim 1 wherein the liquid reaction medium is triethyleneglycol dimethyl ether.

3. The process of claim 1 wherein the liquid reaction medium is diethyleneglycol dimethyl ether.

4. The process of claim 1 wherein the liquid reaction medium is acetonitrile.

5. The process of claim 1 having the further step of acidifying the alkali metal salt of the polyfluoroaliphatic carboxylic acid to convert said salt to the free polyfluoroaliphatic carboxylic acid.

6. The process of claim 1 wherein the alkali metal fluoride is cesium fluoride.

7. A process for preparing alkali metal salts of polyfluorinated aliphatic carboxylic acids which comprises suspending alkali metal fluoride in a liquid reaction medium selected from the group consisting of acetonitrile and polyethyleneglycol dialkylethers of the formula $$RO(C_pH_{2p}O)_nR$$

where R is lower alkyl of 1 to 6 carbon atoms, $p$ is 2 to 4, and $n$ is from 1 to 4, within a closed reaction vessel and incrementally introducing equimolar amounts of carbon dioxide and a polyfluorinated olefin of structure $$CF_2=CXY$$

where X is from the group consisting of F, Cl, and $CF=CF_2$, and Y is from the group consisting of Cl, F, and $CF_3$, said incremental additions being continued until reaction is substantially complete, as indicated by the lack of pressure drop within the closed reaction vessel after introduction of carbon dioxide and polyfluorinated olefin and the disappearance of the alkali metal from the reaction mixture, and recovering from said liquid reaction medium the alkali metal salt of a polyfluoroaliphatic carboxylic acid of the structure $CF_3CXYCO_2Me$ where X and Y have the meanings set forth above and Me is an alkali metal.

8. A process for preparing cesium salts of polyfluorinated aliphatic carboxylic acids which comprises suspending cesium fluoride in a liquid reaction medium selected from the group consisting of acetonitrile and polyethyleneglycol dialkylethers of the formula $RO(C_pH_{2p}O)_nR$, where R is lower alkyl of 1 to 6 carbon atoms, $p$ is 2 to 4, and $n$ is from 1 to 4, within a closed reaction vessel and incrementally introducing equimolar amounts of carbon dioxide and a polyfluorinated olefin of structure $$CF_2=CXY$$

where X is from the group consisting of F, Cl, and $CF=CF_2$, and Y is from the group consisting of Cl, F, and $CF_3$, said incremental additions being continued until reaction is substantially complete, as indicated by the lack of pressure drop within the closed reaction vessel after introduction of carbon dioxide and polyfluorinated olefin and the disappearance of the cesium fluoride from the reaction mixture, and recovering from said liquid reaction mixture the cesium salt of a polyfluoroaliphatic carboxylic acid of the structure $CF_3CXYCO_2Cs$ where X and Y have the meanings set forth above.

9. The process of claim 8 wherein the liquid reaction medium is triethyleneglycol dimethyl ether.

10. The process of claim 8 wherein the liquid reaction medium is diethyleneglycol dimethyl ether.

11. The process of claim 8 wherein the liquid reaction medium is acetonitrile.

12. The process of claim 8 having the further step of acidifying the cesium salt of the polyfluoroaliphatic carboxylic acid to convert said salt to the free polyfluoroaliphatic carboxylic acid.

13. The process of claim 8 in which the polyfluorinated olefin is tetrafluoroethylene.

14. The process of claim 8 in which the polyfluorinated olefin is hexafluoropropylene.

15. The process of claim 8 in which the polyfluorinated olefin is chlorotrifluoroethylene.

16. The process of claim 8 in which the polyfluorinated olefin is perfluorobutadiene-1,3.

References Cited by the Examiner

UNITED STATES PATENTS 2,798,091   7/1957   Mavity _____ 260—533

References Cited by the Applicant

Miller et al.: J. Amer. Chem. Soc., vol. 82, p. 3091 (1960).

Fawcett et al.: J. Amer. Chem. Soc., vol. 84, p. 4275 (1962).

Smith et al.: J. Amer. Chem. Soc., vol. 84, p. 4285 (1962).

Krespan: J. Org. Chem., vol. 27, p. 1813 (1962).

LORRAINE A. WEINBERGER, *Primary Examiner.*

ALBERT P. HALLUIN, *Assistant Examiner.*